(12) United States Patent
Jonasson et al.

(10) Patent No.: US 11,292,479 B2
(45) Date of Patent: Apr. 5, 2022

(54) METHOD AND SYSTEM FOR ASSISTING A DRIVER IN THE EVENT OF A ROAD DEPARTURE

(71) Applicant: Volvo Car Corporation, Gothenburg (SE)

(72) Inventors: Mats Jonasson, Partille (SE); Derong Yang, Vastra Frolunda (SE); Rickard Nilsson, Hisings Karra (SE)

(73) Assignee: Volvo Car Corporation, Gothenburg (SE)

( * ) Notice: Subject to any disclaimer, the term of this patent is extended or adjusted under 35 U.S.C. 154(b) by 309 days.

(21) Appl. No.: 16/566,947

(22) Filed: Sep. 11, 2019

(65) Prior Publication Data
US 2020/0079391 A1 Mar. 12, 2020

(30) Foreign Application Priority Data
Sep. 12, 2018 (EP) .................................... 18194006

(51) Int. Cl.
| | | |
|---|---|---|
| *B60W 50/00* | (2006.01) | |
| *G08G 1/16* | (2006.01) | |
| *B60W 10/04* | (2006.01) | |
| *B60W 10/18* | (2012.01) | |

(Continued)

(52) U.S. Cl.
CPC ............ *B60W 50/00* (2013.01); *B60W 10/04* (2013.01); *B60W 10/18* (2013.01); *B60W 10/20* (2013.01); *G08G 1/166* (2013.01); *B60W 2540/30* (2013.01); *G05D 1/0223* (2013.01)

(58) Field of Classification Search
CPC ...... B60W 50/00; B60W 10/04; B60W 10/18; B60W 10/20; B60W 2540/30; B60W 2540/18; B60W 2552/35; B60W 2710/202; B60W 2720/10; B60W 2556/10; B60W 30/12; B60W 30/095; B60W 2420/42;
(Continued)

(56) References Cited

U.S. PATENT DOCUMENTS

| | | | | |
|---|---|---|---|---|
| 5,765,116 A | * | 6/1998 | Wilson-Jones | ...... G05D 1/0246 340/439 |
| 5,854,987 A | * | 12/1998 | Sekine | .................. G01C 21/28 180/443 |
| 7,102,539 B2 | | 9/2006 | Kawazoe et al. | |

(Continued)

OTHER PUBLICATIONS

Mar. 5, 2019 European Search Report issue on International Application No. EP18194006.5.

(Continued)

*Primary Examiner* — B M M Hannan
(74) *Attorney, Agent, or Firm* — Clements Bernard Walker; Christopher L. Bernard

(57) ABSTRACT

The present invention relates to a method for assisting a driver of a host vehicle in the event of a road departure. Collecting a set of drive parameter values, wherein each drive parameter is indicative of a present driving condition parameter for the vehicle. Calculating a collective road departure value based on the set of drive parameter values. When the road departure value exceeds a road departure threshold value, adapt at least one of the speed of the vehicle or the steering torque applied by the steering control system to the steerable wheels of the vehicle, until the road departure value is below the road departure threshold value.

17 Claims, 2 Drawing Sheets

(51) Int. Cl.
*B60W 10/20* (2006.01)
*G05D 1/02* (2020.01)

(58) Field of Classification Search
CPC .. B60W 2510/22; G08G 1/166; G05D 1/0223
USPC .......................................................... 701/41
See application file for complete search history.

(56) References Cited

U.S. PATENT DOCUMENTS

| | | |
|---|---|---|
| 7,479,892 B2 | 1/2009 | Ling et al. |
| 2004/0010371 A1* | 1/2004 | Matsumoto ......... B60T 8/17557 701/300 |
| 2005/0096827 A1* | 5/2005 | Sadano ............... B60T 8/17557 701/70 |
| 2005/0113999 A1* | 5/2005 | Tange ................ B60T 8/17557 701/41 |
| 2005/0212666 A1* | 9/2005 | Kawazoe ............... G07C 5/085 340/436 |
| 2005/0236210 A1* | 10/2005 | Kawazoe ............. B62D 15/029 180/272 |
| 2007/0288133 A1* | 12/2007 | Nishira ................ G05D 1/0246 701/23 |
| 2008/0243337 A1* | 10/2008 | Tsuda .................... B60W 50/14 701/41 |
| 2009/0048738 A1* | 2/2009 | Iwazaki ............... B62D 15/025 701/44 |
| 2009/0192710 A1* | 7/2009 | Eidehall ............ B60W 50/0097 701/300 |
| 2011/0015850 A1* | 1/2011 | Tange .................. B62D 15/025 701/116 |
| 2012/0033076 A1* | 2/2012 | Nakamura ........... B60W 10/18 348/148 |
| 2012/0239255 A1 | 9/2012 | Kojima et al. |
| 2013/0226408 A1* | 8/2013 | Fung ...................... B62D 6/007 701/41 |
| 2015/0203109 A1 | 7/2015 | McClain et al. |
| 2016/0090084 A1 | 3/2016 | Takamatsu et al. |
| 2016/0339910 A1* | 11/2016 | Jonasson .............. G05D 1/0061 |
| 2016/0368534 A1* | 12/2016 | Harda .................... H04N 7/181 |
| 2017/0349173 A1* | 12/2017 | Nishiguchi ........ B62D 15/0255 |
| 2018/0037260 A1* | 2/2018 | Otake .................. B62D 15/025 |
| 2018/0105171 A1 | 4/2018 | Tsuji et al. |
| 2018/0134290 A1* | 5/2018 | Kataoka ............... B60W 30/12 |
| 2018/0158338 A1* | 6/2018 | Kawaguchi ........... B60W 50/14 |
| 2018/0170378 A1* | 6/2018 | Oka ...................... B60W 40/072 |
| 2018/0201318 A1* | 7/2018 | Kataoka ............... B62D 15/025 |
| 2019/0092380 A1* | 3/2019 | Miccinilli ............ B62D 15/024 |
| 2021/0139075 A1* | 5/2021 | Ren .......................... B62D 6/02 |

OTHER PUBLICATIONS

Office action issued in the corresponding EP application No. 18194006.5.

* cited by examiner

METHOD AND SYSTEM FOR ASSISTING A DRIVER IN THE EVENT OF A ROAD DEPARTURE

CROSS-REFERENCE TO RELATED APPLICATION

The present disclosure claims the benefit of priority of co-pending European Patent Application No. 18194006.5, filed on Sep. 12, 2018, and entitled "METHOD AND SYSTEM FOR ASSISTING A DRIVER IN THE EVENT OF A ROAD DEPARTURE," the contents of which are incorporated in full by reference herein.

FIELD OF THE INVENTION

The present invention relates to a method for assisting a driver of a host vehicle in the event of a road departure and to a corresponding drive assist system.

BACKGROUND OF THE INVENTION

Todays vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle.

Lane keeping systems are another example of advanced driver assist systems. A lane keeping system may be configured to detect the position of visible lane markers on the road relative to the vehicle and to assist the driver in maintaining the vehicle on the safe side of the lane markers, inside the lane.

However, lane keeping systems do not assist once the vehicle is off the road, i.e. in the event of a road departure.

Accordingly, there is a need for assisting vehicle drivers to control the vehicle in a safe way in the event of a road departure.

SUMMARY

In view of above-mentioned prior art, it is an object of the present invention to provide a method for assisting a driver of a host vehicle in the event of a road departure. There is also provided a driver assist system for a vehicle for assisting a driver of a host vehicle in the event of a road departure.

According to a first aspect of the invention, there is provided a method for assisting a driver of a host vehicle in the event of a road departure, the method comprising: collecting a set of drive parameter values, wherein each drive parameter is indicative of a present driving condition parameter for the vehicle, calculating a collective road departure value based on the set of drive parameter values; and when the road departure value exceeds a road departure threshold value, adapting at least one of the speed of the vehicle or the steering torque applied by the steering control system to the steerable wheels of the vehicle, until the road departure value is below the road departure threshold value.

The present invention is based on the realization that in the event of a road departure it is often the case that one of two hazards occurs. The first one is that the driver controls the vehicle such that the vehicle overshoots the steering or speed, whereby the vehicle enters into the opposite lane or departs the road on the opposite side. This is often the case for unexperienced drivers, situations with unexpected high grip on the road, or generally in case of an excessive steering angle provided by the driver. The second hazard is that the driver is unable to steer the vehicle back to its ego-lane. This may occur due to e.g. large off-road banking, high road edge, and poor off-road grip.

Based on the above, the invention is based on the realization to provide the driver with an assist steering torque and/or assist speed or brake, such that the driver can return to vehicle to the safe lane. Accordingly, the driver is intended to be responsible for the main control of the vehicle travel path and speed, but the assist function provided by the invention alleviates to avoid at least the above two mentioned hazards.

For this, the invention relies on calculating a collective road departure value based on a set of drive parameter values. Thus, a combination of drive parameters is used for assessing whether or not to adapt the speed or the steering angle of the vehicle.

In accordance with the inventive concept, the adaption of the speed and steering angle is not performed in an autonomous intervening manner but rather as an assist function in combination with the driver's control of the vehicle speed and steering.

Accordingly, within the inventive concept, an assist system is provided for assisting the driver to steer the vehicle in a safe way back to its ego-lane in the event that the vehicle has actually departed the road.

According to one embodiment, the method may include determining that the road departure was intentional or unintentional, and adapting at least one of the speed of the vehicle or the steering torque only if the road departure was unintentional. There may be situations where the road departure was intentional. For example, the driver may cut corners which may lead to an intentional road departure. Thus, it is advantageous to first confirm that the road departure was unintentional before adapting the speed or steering torque.

According to one embodiment, determining that the road departure was intentional or unintentional may be based on prior driving style data indicative of the driving style for the specific driver, or based on historical travelling path data indicative of traveling paths for a plurality of vehicles at a specific location. Thus, the determination of the intention of the road departure may be determined based on driver specific attributes or location specific attributes. Thus, a control algorithm may be taught the driver style of the driver in order to judge whether or not a road departure was intentional in an actual driving situation. In addition, a control algorithm may be taught on a fleet or vehicle to learn if many of them tend to depart the road at specific locations.

According to one embodiment, the method may comprise detecting a driver initiated driving action; and adapting at least one of the speed of the vehicle or the steering torque also based on the driver initiated driving action. The adaptation may thus advantageously also take into account the actions of the driver.

According to one embodiment, adapting at least one of the speed of the vehicle or the steering torque is performed for an additional margin time duration after the road departure value is determined to be below the road departure threshold value. As an additional precaution the driver assist functionality is active also a margin time after the vehicle has recovered from the road departure. This provides increased safety for the driver and occupants of the vehicle when the vehicle recovered from the road departure.

According to one embodiment, the drive parameter values may be counters indicative of whether or not a measured driving condition parameter values exceeds a respective threshold value. This provides an advantageous way to adapt the calculation of the collective road departure value for driver parameters of different units.

According to embodiments, the collective road departure value may be a weighted sum of the counters. In this way, it is possible to take the accuracy of each determined drive parameter value, or the importance of the individual drive parameter value, into account when calculating the collective road departure value. Thus, the weights may be selected based on an accuracy of the respective measured driving condition parameter.

The driving condition parameters may be at least one of: time derivative of rack force in steering system, vertical jerk, angular jerk, suspension travel energy differences, time derivative of wheel speed, longitudinal jerk, and visual detection of vehicle location with respect to road surface. A jerk is generally a time derivative of acceleration in the respective direction.

According to embodiments, the set of driving condition parameters may comprises an indication of a detected presence of a secondary vehicle on collision course with the host vehicle, wherein adapting at least one of the speed of the vehicle or the steering torque is performed to avoid a collision with the secondary vehicle. Avoiding collisions provides increased safety for the occupant of the vehicle.

According to embodiments, calculating a safe path for the host vehicle based on the set of drive parameter values, and adapting at least one of the speed of the vehicle or the steering torque based on the calculated safe path. The safe path advantageously provides a path the adaptation of the speed or the steering torque of the vehicle to strive towards.

According to a second aspect of the invention, there is provided a drive assist system for a vehicle for assisting a driver of the host vehicle in the event of a road departure, the drive assist system comprising: a set of sensors configured to detect driving condition parameters for the vehicle; a steering control system configured to control the steering torque applied to the steerable wheels of the vehicle; a wheel torque control system for controlling a propulsion or brake torque applied to at least one of the wheels of the vehicle; and a vehicle control unit configured to: determine a set of drive parameter values based on detected driving condition parameters; calculate a collective road departure value based on the set of drive parameter values; and control at least one of the steering control system and the wheel torque control system to adapt the speed of the vehicle or the steering torque applied to the steerable wheels of the vehicle until the road departure value is below the road departure threshold value.

According to one embodiment, the set of sensors may comprise at least one of an image capturing device, an inertial measurement unit, and suspension travel sensors.

According to one embodiment, the control unit may be configured to: calculate a safe path for the host vehicle based on the set of drive parameter values, and control at least one of the steering control system and the wheel torque control system to adapt at least one of the speed of the vehicle and the steering torque based on the calculated safe path.

A control unit may include at least one microprocessor, microcontroller, programmable digital signal processor or another programmable device.

Effects and features of the second aspect of the invention are largely analogous to those described above in connection with the first aspect of the invention.

There is further provided vehicle comprising the drive assist system according to any one of the above embodiments.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
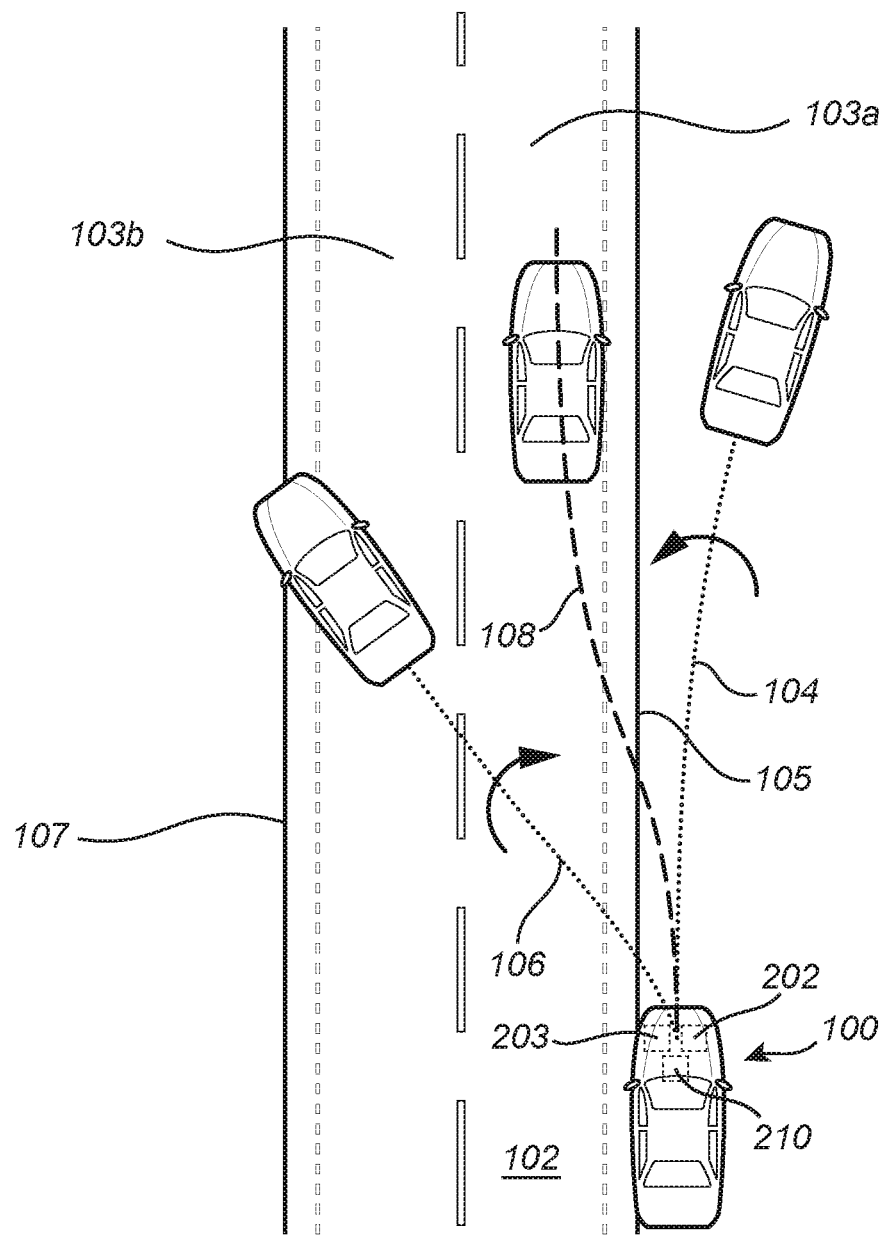
FIG. 1 illustrates a schematic overview of exemplifying application of embodiments of the invention.

In the present detailed description, various embodiments of the system and method according to the present invention are described. However, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 illustrates a schematic overview of exemplifying application of embodiments of the invention. A drive assist system is comprised in a host vehicle 100 here shown travelling next to the road 102. The road is delimited by outer edges 105 and 107. The road is here shown to have two lanes, the lane 103a which is the intended ego-lane of the host vehicle 100 and an opposing lane 103b.

The host vehicle 100 comprises set of sensors (not shown) configured to detect driving condition parameters for the vehicle 100. The host vehicle 100 further comprises a wheel torque control system 203 for controlling a propulsion or brake torque applied to at least one of the wheels of the vehicle 100 and a steering control system 202 configured to control the steering torque applied to the steerable wheels of the vehicle 100.

A vehicle control unit 210 is comprised in the vehicle 100 and is configured to control the steering control system 202 and the wheel torque control system 203. Thus the vehicle control unit 210 can communicate with the steering control system 202 and the wheel torque control system 203 via suitable communication means such as e.g. CAN-buses or wireless communication such that the vehicle control unit 210 can send control signal to the steering control system 202 and the wheel torque control system 203.

As illustrated in FIG. 1, the host vehicle 100 has departed the road 102. In this case the vehicle 100 has fully departed the road, i.e. all wheels of the vehicle 100 are outside the road surface 102, however, this is not a requirement for the inventive concept.

Path 104 is one of two illustrated hazardous paths that may occur in the event of a road departure. The vehicle 100 may have unintentionally departed the road surface, and the driver may attempt to steer back to the road 102 but fail. For example, large off-road banking, high road edge 105, and poor off-road grip may be conditions that prevent the driver to by himself/herself return the vehicle to the ego lane 103a. Instead, the vehicle 100 may unintentionally and hazardously pursue the deviating path 104.

As a further example of a hazardous situation is path 106 illustrated. The path 106 is typical for an overshoot control of the vehicle 100 and may be caused by e.g. an unexperienced driver driving the vehicle 100, unexpected high grip on the road 102, or generally an excessive steering angle.

Instead, with the inventive concept, a set of drive parameter values are collected that are indicative of the present driving condition for the vehicle 100. Analyzing the present driving condition by means of comparing a collective road departure value to a threshold value enables to adapt the speed or steering torque of the vehicle such that the driver safely can return the vehicle 100 to ego lane 103a via the exemplary path 108 without deviating or overshooting the vehicle path.

Figure 2:
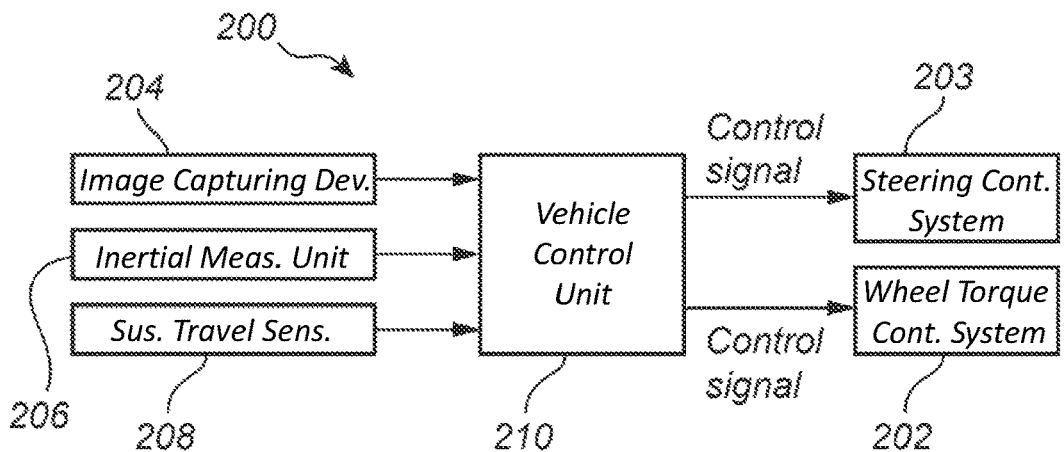
FIG. 2 is a box diagram of a drive assist system according to embodiments of the invention.

FIG. 2 is a box diagram of a drive assist system 200 for a vehicle according to example embodiments of the invention. The system 200 comprises a set of sensors 204, 206, 208 configured to detect driving condition parameters for the vehicle. The sensors may comprise an image capturing device 204, an inertial measurement unit 206, and suspension travel sensors 208.

The drive assist system 200 further comprises a steering control system 202 configured to control the steering torque applied to the steerable wheels of the vehicle, and a wheel torque control system 203 for controlling a propulsion or brake torque applied to at least one of the wheels of the vehicle.

A vehicle control unit 210 is configured to receive driving condition parameter data from the sensors 204, 206, 208. Based on the data, the vehicle control unit 210 determines a set of drive parameter values. The vehicle control unit 210 processes the set of drive parameter values to calculate a collective road departure value which is compared to a road departure threshold value. Then, the vehicle control unit 210 is configured to control the steering control system 202 and/or the wheel torque control system 203 via control signals to adapt at least one of the speed of the vehicle or the steering torque applied to the steerable wheels of the vehicle, until the road departure value is below the road departure threshold value.

In some embodiments, the vehicle control unit 210 is configured to calculate a safe drive path, i.e. path 108 in FIG. 1, and to control at least one of the steering control system 202 and the wheel torque control system 203 to adapt at least one of the speed of the vehicle and the steering torque based on the calculated safe path. In other words, the adaptation of the speed of the vehicle and the steering torque together with the drivers input is such that to assist the driver in a safe way to the safe path 108 after a road departure.

The steering control system 203 may comprise an electrically powered assisted steering system. Thus, the vehicle control unit 210 may request a steering torque to be added to the steering system by the electrically powered assisted steering system. The requested steering torque ($T_{steer}$) may be given by:

$$T_{steer} = K_p(A_{ref} - A_{actual})$$

where $K_{fb}$ is a feedback gain factor and is a tunable constant, $A_{ref}$ is a reference steering angle which is calculated with regards to the required steering profile to steer the vehicle along the safe path 108, and $A_{actual}$ is the present actual steering angle.

Accordingly, the steering control system 203 comprised in the system 200 is configured to control the curvature of the present path for the host vehicle 100, by applying an overlay steering torque. The steering torque is used for turning the steerable wheels of the vehicle to a desirable wheel angle which corresponds to a desired curvature.

The steering control system 203 may comprise a controller which calculates the required steering angle in order to follow a desired curvature, using e.g. a vehicle model. In addition, the steering control system 203 may comprise an electric machine to provide the overlay steering torque.

Figure 3:
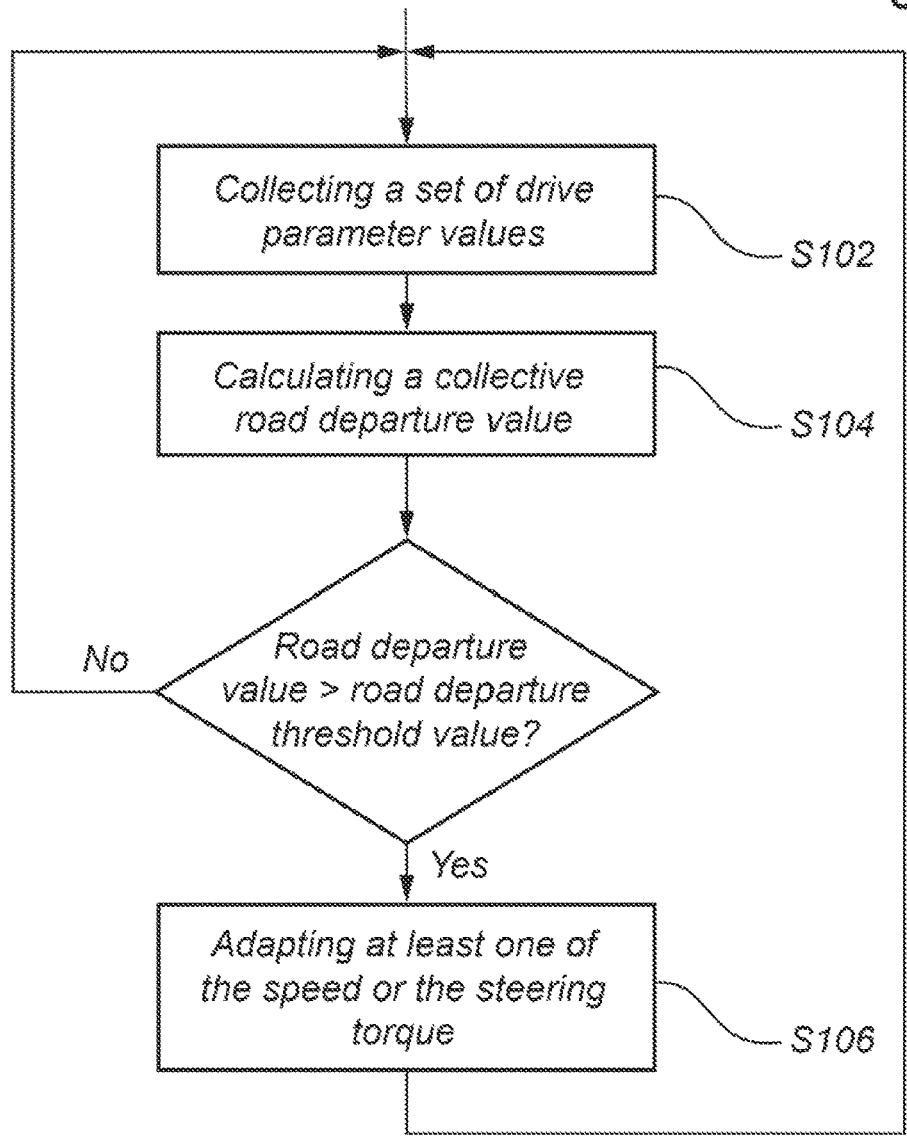
FIG. 3 is a flow-chart of method steps according to embodiments of the invention.

Next, embodiments of the invention will be described with reference to a flow-chart of method step shown in FIG. 3.

In step S102 is a set of drive parameter values collected. Each drive parameter is indicative of a present driving condition parameter for the vehicle.

A collective road departure value is calculated based on the set of drive parameter values in step S104.

The road departure value is compared to a road departure threshold value. When the road departure value exceeds the road departure threshold value, at least one of the speed of the vehicle or the steering torque applied by the steering control system to the steerable wheels of the vehicle is adapted in step S106.

The invention will now be exemplified with a non-limiting example.

Environmental sensors such as a camera may be used to detect whether the vehicle is on the road or not. If the vehicle is on the road then the corresponding drive parameter value $d_1=0$, otherwise $d_1=1$.

Wheel speed sensors and/or accelerometers (i.e. part of an inertial measurement unit) may be used to detect a present increase in translational acceleration of a wheel and/or the wheel speed. If the increase is above a threshold, then the corresponding drive parameter value $d_2=1$, otherwise $d_2=0$.

The rack force in steering system may be detected. If a change in rack force, i.e. the time derivative during a time frame exceeds a threshold, then the corresponding drive parameter value $d_3=1$, otherwise $d_3=0$.

The vertical jerk, i.e. the time derivative of the vertical acceleration may be used as an indicator of rough road. Departure from the road will cause noticeable jerk. If a change vertical jerk during a time frame exceeds a threshold, then the corresponding drive parameter value $d_4=1$, otherwise $d_4=0$.

The angular jerk level may be used as an additional indicator of rough road. Departure from the road will cause noticeable jerk. If change angular jerk (time derivative) during a time frame exceeds a threshold, then the corresponding drive parameter value $d_5=1$, otherwise $d_5=0$.

Suspension travel sensors may be used for assessing the roughness of the road. Rough road on one side of the vehicle will mean significant difference in energy levels between left and right suspension side. If the suspension travel difference exceeds a threshold then the corresponding drive parameter value $d_6=1$, otherwise $d_6=0$.

In the above example, the drive parameter values are counters indicative of whether or not a measured driving condition parameter values exceeds a respective threshold value.

The collective road departure value is calculated based on the drive parameter values. For example, the road departure value ($d_{tot}$) may generally be calculated as:

$$d_{tot} = \frac{w_1 \times d_1 + w_2 \times d_2 + w_3 \times d_3 + w_4 \times d_4 + w_5 \times d_5 + w_6 \times d_6}{w_1 + w_2 + w_3 + w_4 + w_5 + w_6},$$

in other words as a weighted sum. The weights $w_1$, $w_2$, $w_3$, $w_4$, $w_5$, $w_6$ may depend on how reliable the respective measurement method is or the relevance of the respective parameter is for the assessment of a road departure.

If $d_{tot} > d_{threshold}$, then the vehicle is estimated to have departed the road.

The calculation of the road departure value and comparison with the threshold value may be performed continuously such that the adaptation of the steering torque and vehicle speed may be continued adaptively until the road departure value no longer exceeds the threshold. In some embodiments the adaption continues for a time margin after the road departure value no longer exceeds the threshold.

Alongside with the adaptation of the vehicle speed and steering torque, a driver initiated driving action is detected. The speed and wheel torque added by the wheel torque control system and the steering control system takes the driver initiated driving action into account. A driver initiated driving action may be detected by detecting a driver initiated turn of the steerable wheels of the vehicle, or a driver initiated turning of the steering wheel, or detecting an altered steering wheel angular speed, or detecting a torsion bar torque in the steering mechanism, to mention some examples.

A vehicle in accordance with the invention may be any vehicle operative on a road, such as a car, a truck, a lorry, a bus, etc.

The vehicle control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for assisting a driver of a host vehicle in the event of a road departure, the method comprising:
   collecting a set of drive parameter values, wherein each drive parameter is indicative of a present driving condition parameter for the host vehicle;
   calculating a collective road departure value based on the set of drive parameter values; and
   when the collective road departure value exceeds a road departure threshold value indicating an amount of road departure that is a safety concern, adapting at least one of a speed of the host vehicle or a steering torque applied by a steering control system to steerable wheels of the host vehicle, until the collective road departure value is below the road departure threshold value.

2. The method according to claim 1, further comprising:
   determining that the road departure was intentional or unintentional; and
   adapting at least one of the speed of the host vehicle or the steering torque only when the road departure was unintentional.

3. The method according to claim 2, wherein determining that the road departure was intentional or unintentional is based on prior driving style data indicative of a driving style for a specific driver, or based on historical travelling path data indicative of traveling paths for a plurality of vehicles at a specific location.

4. The method according to claim 1, further comprising:
   detecting a driver initiated driving action; and
   adapting at least one of the speed of the host vehicle or the steering torque also based on the driver initiated driving action.

5. The method according to claim 1, wherein:
   adapting at least one of the speed of the host vehicle or the steering torque is performed for an additional margin time duration after the collective road departure value is determined to be below the road departure threshold value.

6. The method according to claim 1, wherein the drive parameter values are counters indicative of whether or not a measured driving condition parameter values exceeds a respective threshold value.

7. The method according to claim 6, wherein the collective road departure value is a weighted sum of the counters.

8. The method according to claim 7, wherein the weights are selected based on an accuracy of the respective measured driving condition parameter.

9. The method according to claim 1, wherein the driving condition parameters are at least one of: time derivative of rack force in steering system, vertical jerk, angular jerk, suspension travel energy differences, time derivative of wheel speed, longitudinal jerk, time derivative of acceleration, and visual detection of host vehicle location with respect to road surface.

10. The method according to claim 1, wherein the set of drive parameter values comprises an indication of a detected presence of a secondary vehicle on collision course with the host vehicle, wherein adapting at least one of the speed of the host vehicle or the steering torque is performed to avoid a collision with the secondary vehicle.

11. The method according to claim 1, further comprising:
calculating a safe path for the host vehicle based on the set of drive parameter values; and
adapting at least one of the speed of the host vehicle or the steering torque based on the calculated safe path.

12. A drive assist system for a host vehicle for assisting a driver of the host vehicle in the event of a road departure, the drive assist system comprising:
a set of sensors configured to detect driving condition parameters for the host vehicle;
a steering control system configured to control a steering torque applied to steerable wheels of the host vehicle;
a wheel torque control system for controlling a propulsion or brake torque applied to at least one of the steerable wheels of the host vehicle; and
a vehicle control unit configured to:
determine a set of drive parameter values based on detected driving condition parameters;
calculate a collective road departure value based on the set of drive parameter values; and
control at least one of the steering control system and the wheel torque control system to adapt a speed of the host vehicle or the steering torque applied to the steerable wheels of the host vehicle until the collective road departure value is below a road departure threshold value indicating an amount of road departure that is a safety concern.

13. The drive assist system according to claim 12, wherein the set of sensor comprises at least one of an image capturing device, an inertial measurement unit, and suspension travel sensors.

14. The drive assist system according to claim 12, wherein the vehicle control unit is further configured to:
calculate a safe path for the host vehicle based on the set of drive parameter values; and
control at least one of the steering control system and the wheel torque control system to adapt at least one of the speed of the host vehicle and the steering torque based on the calculated safe path.

15. A vehicle comprising drive assist system for assisting a driver of the vehicle in the
event of a road departure, the drive assist system comprising:
a set of sensors configured to detect driving condition parameters for the vehicle;
a steering control system configured to control a steering torque applied to steerable wheels of the vehicle;
a wheel torque control system for controlling a propulsion or brake torque applied to at least one of the steerable wheels of the vehicle; and
a vehicle control unit configured to;
determine a set of drive parameter values based on detected driving condition parameters;
calculate a collective road departure value based on the set of drive parameter values; and
control at least one of the steering control system and the wheel torque control system to adapt a speed of the vehicle or the steering torque applied to the steerable wheels of the vehicle until the collective road departure value is below a road departure threshold value indicating an amount of road departure that is a safety concern.

16. The vehicle according to claim 15, wherein the set of sensor comprises at least one of an image capturing device, an inertial measurement unit, and suspension travel sensors.

17. The vehicle according to claim 15, wherein the vehicle control unit is further configured to:
calculate a safe path for the vehicle based on the set of drive parameter values; and
control at least one of the steering control system and the wheel torque control system to adapt at least one of the speed of the vehicle and the steering torque based on the calculated safe path.

* * * * *